Sept. 15, 1964       A. MENUTO       3,148,675
COMBINATION VEHICLE AND WATER HEATING DEVICE
Filed Jan. 12, 1961                    2 Sheets-Sheet 1
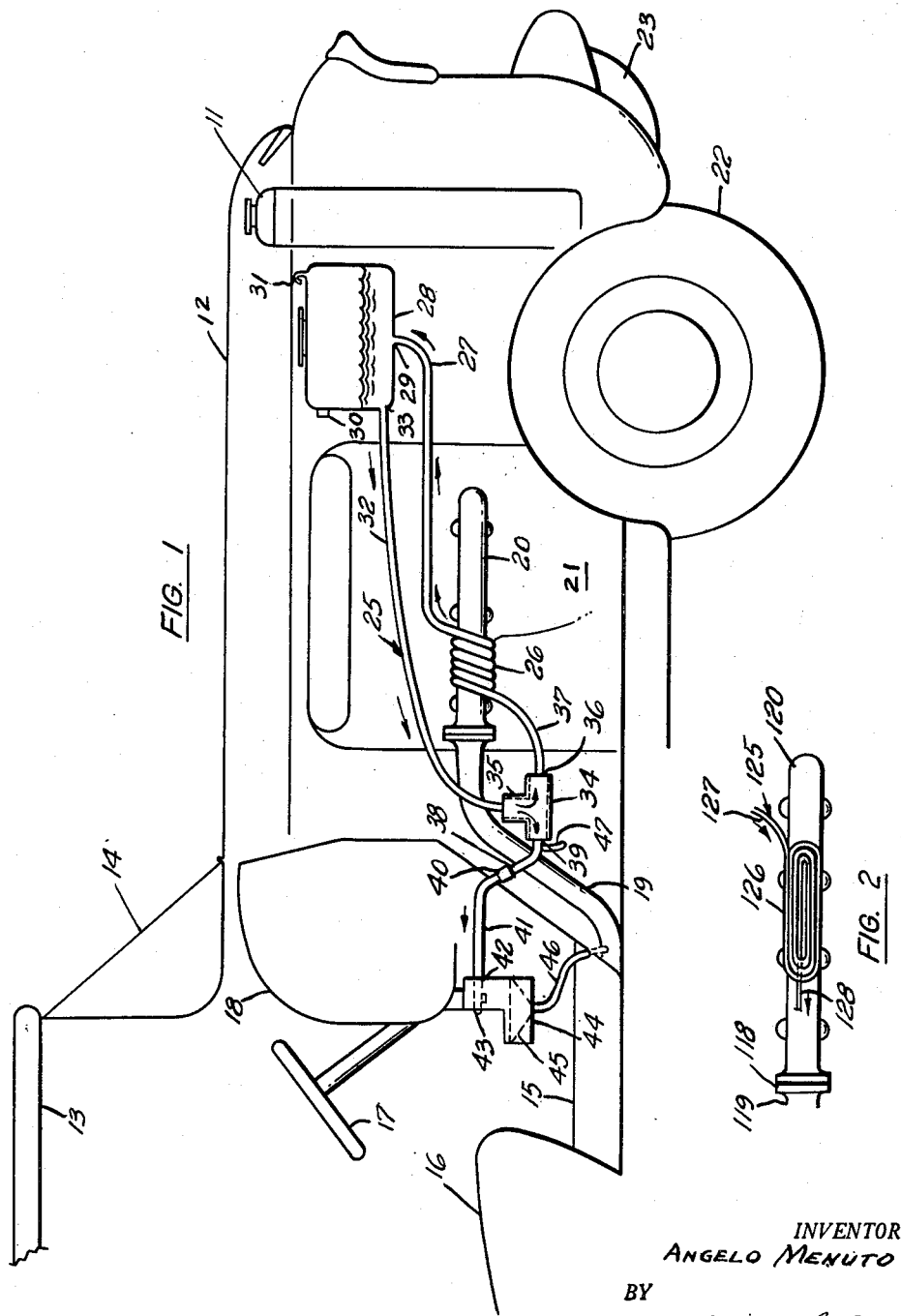
INVENTOR.
ANGELO MENUTO
BY
Charles L. Lovercheck
attorney

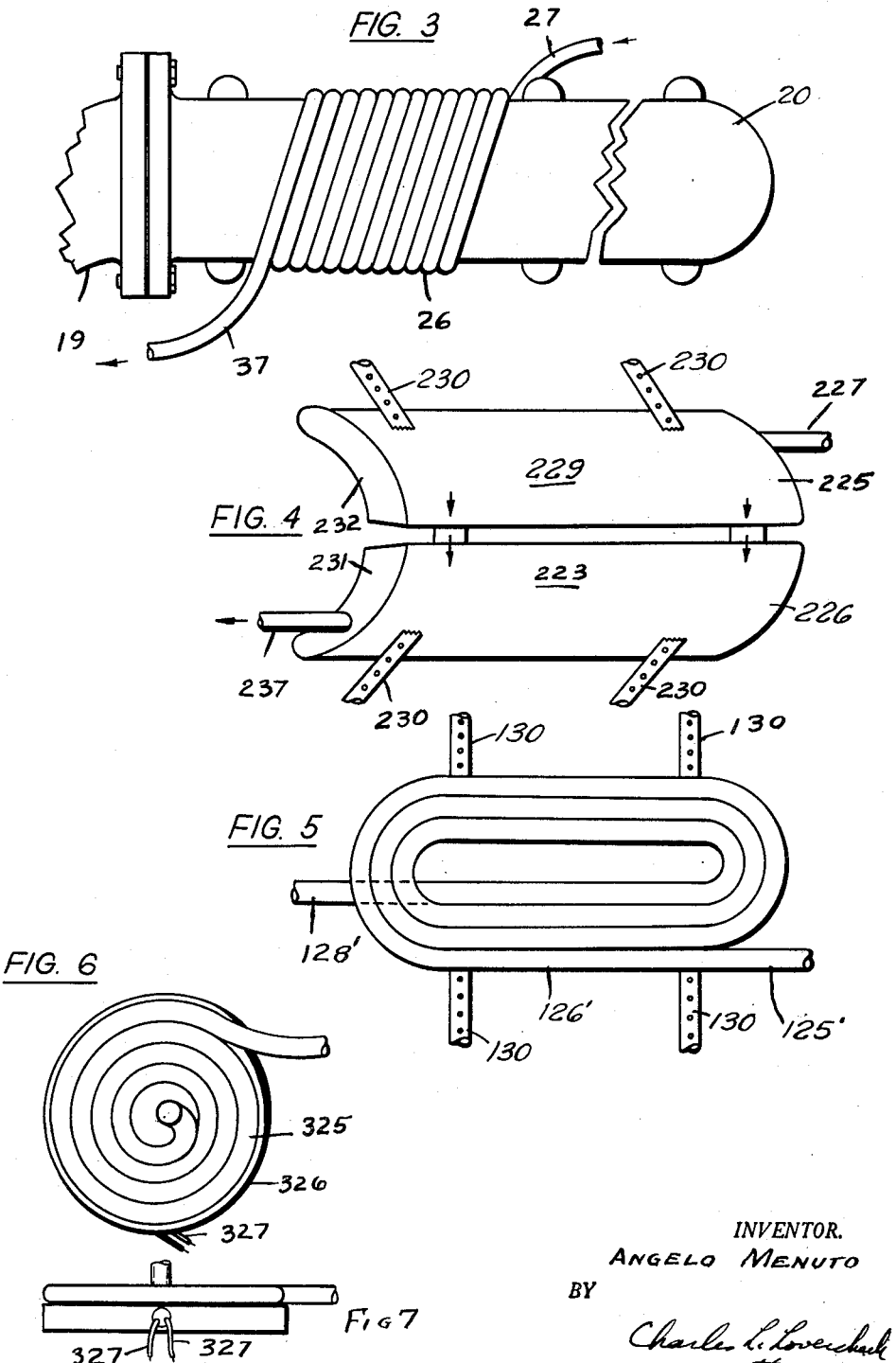

United States Patent Office 3,148,675
Patented Sept. 15, 1964

3,148,675
COMBINATION VEHICLE AND WATER
HEATING DEVICE
Angelo Menuto, 2820 Sigsbee St., Erie, Pa.
Filed Jan. 12, 1961, Ser. No. 82,274
1 Claim. (Cl. 126—19.5)

This invention is directed to an improved water heating unit adapted to be mounted on a motor vehicle and conveniently disposed thereon and useful for heating water in the vehicle for such purposes as making hot beverages. The unit is especially useful in automobiles, trucks, tractors, trailers, and the like.

Persons travelling, especially those travelling with infants, and persons who like to have hot beverages served while travelling usually have to carry a hot water supply in a thermos jug or the like. The water heating mechanisms for use on automotive vehicles for heating water to be used by the occupants of the vehicles which have been previously proposed have been complicated and inefficient.

It is, accordingly, an object of the present invention to provide a device for heating water suitable for use in making hot beverages which will provide a supply of hot water for the preparation of such beverages. Such supply of hot water is maintained at a relatively high temperature by an improved heating device connected to the manifold of the vehicle.

Another object of the invention is to provide an improved connection in a hot water supply for a vehicle which makes it possible to provide hot water for personal use.

A further object of the invention is to provide a hot beverage unit which is designed for convenience, ease, economy of manufacture, simple installation, and rugged construction and yet is neat in appearance.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a schematic view of a motor vehicle showing a water heating system according to the invention mounted thereon;

FIG. 2 is a partial view of another embodiment of the invention;

FIG. 3 is an enlarged view of the heater shown in FIG. 1;

FIG. 4 is a view of another embodiment of the invention;

FIG. 5 is a view of still another embodiment of the invention; and

FIGS. 6 and 7 are views of yet another embodiment of the invention.

Now with more particular reference to the drawings, a motor vehicle is shown made up of a conventional radiator 11, a hood 12, a top 13, a windshield 14, a floor 15, a seat 16, a steering wheel 17, a dash 18, an exhaust pipe 19, an exhaust manifold 20, an engine 21, wheels 22, and a bumper 23. This vehicle is shown for purposes of illustration only and is not intended to limit the invention in any way other than wherein it is specifically limited in the appended claims.

Supported on the vehicle described hereinbefore is a hot water heating system 25 made up of a heating coil 26. The coil 26 may be a copper tube or the like coiled around a part of the exhaust manifold 20 and having its inlet end connected through a straight portion of a tube 27 to the bottom of a tank 28 at 29 by a soldered connection or the like. The tank 28 may be a suitable rectangular tank containing one gallon of water, for example, and it may be supported by brackets 30 and 31 to a suitable fixed supporting member on the vehicle.

A pipe 32 is connected and soldered to the tank 28 at 33. The tube 27 may be made of copper pipe or the like, as well as the pipe 32.

An important feature of the invention is a T connection 34 which contributes in holding the water at the proper temperature. The connection 34 has a straight portion as shown with a branch 35 integrally connected thereto. The T 34 has an inlet opening 36 connected to a tube 37 and the outlet of the T is connected to the branch 35 which is the pipe 32 which may be soldered to the T.

An end 39 of the T opposite the opening 36 is connected to a pipe 38 and it is connected to a tube 41 through a flexible vibration of a sound isolation connection 40. The tube 41 is connected at 42 to a faucet 43 which is mounted on the inside dash of the vehicle and accessible to the occupants thereof. A sink 44 has a funnel like arrangement 45 for receiving waste water from the faucet 43. The sink 44 discharges this water through a waste tube 46 to the ground below the vehicle. A connection 47 to the pipe 38 is provided to which the hot water could be connected to a house trailer or to another auxiliary place of use.

In the embodiment of the invention shown in FIG. 2, an exhaust manifold 120 is shown which is intended to be the exhaust manifold of a motor vehicle. The manifold has a heating coil 126 connected thereto. The heating coil is made up of a plurality of turns of coil tubing 125 which is connected between an inlet pipe 127 and an outlet pipe 128. The coils of the tubing 125 are wound in a single plane and may be supported on the exhaust manifold 120 by means of a suitable bracket or by soldering the braces to the manifold or the like. The coil 126 has generally elliptical turns as shown which are concentric to each other in that they are wound one inside the other. The major axes of all of the turns are coextensive.

FIG. 5 is an enlarged view similar to FIG. 2 but showing straps 130 suitable for wrapping around a manifold to attach a heating unit 125′ to the manifold.

The embodiment of the invention shown in FIG. 4 discloses an inlet pipe 227 and an outlet pipe 237 connected to two generally flat containers 225 and 226. These containers have generally parallel sides spaced from each other and the entire device is formed to lie along an exhaust manifold, an outer side 229 being one end and a corresponding side 223 being the other end. Ends 231 and 232 close one end of the container and the other end is closed by a similar end. The device can be attached to an exhaust manifold by a strap 230 in a manner similar to that shown in FIG. 5.

The embodiment of the invention shown in FIGS. 6 and 7 is a modified embodiment wherein a coil 325 of copper tubing may have a heating element such as an insulated resistance wire wrapped around it at 327 to heat it and for connecting it to a suitable source of electrical power such as the receptacle of a cigarette lighter on an automobile.

All of the embodiments will be connected up with a T such as the T 34 in FIG. 1. This T allows the water to recirculate and prevents it from ever being heated beyond the boiling point; yet allows it to be heated up to the boiling point. This is an important feature of the present invention.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

A heater for heating water in a motor vehicle comprising, in combination, a tank, a first tube, a T, and a faucet adapted to be mounted on a motor vehicle having an exhaust manifold, said first tube having an inlet connected to said T and an outlet connected to the bottom of said tank, said faucet being connected to said T and adapted to be disposed on a vehicle at a lower elevation than the bottom of said tank, the intermediate part of said first tube between said inlet and said outlet being wound in the form of a coil having a plurality of concentric turns generally in the shape of an ellipse, all portions of the center line of said intermediate part of said first tube being disposed in a common plane, the long sides of said elliptical shape of turns being generally parallel to each other, the longitudinal axis of each said ellipse being coextensive, each said turn being adapted to be in contact with a manifold, and means for attaching said intermediate part of said tube to a manifold.

References Cited in the file of this patent

UNITED STATES PATENTS

| | | |
|---|---|---|
| 924,513 | Timmerhoff | June 8, 1909 |
| 1,414,751 | Rumery et al. | May 2, 1922 |
| 1,727,015 | McClurg | Sept. 3, 1929 |
| 1,824,921 | Oishei | Sept. 29, 1931 |
| 2,894,265 | Reardon | July 14, 1959 |

FOREIGN PATENTS

| | | |
|---|---|---|
| 516,846 | Canada | Sept. 27, 1955 |